United States Patent [19]

Schuhmacher et al.

[11] 4,321,173

[45] Mar. 23, 1982

[54] METHOD FOR THE PREPARATION OF FINELY DISPERSED POLYURETHANE UREAS

[75] Inventors: Günter Schuhmacher; Bertram Freudenberg, both of Weinheim; Horst Mühlfeld, Grasellenbach-Wahlen, all of Fed. Rep. of Germany

[73] Assignee: Firma Carl Freudenberg, Weinheim, Fed. Rep. of Germany

[21] Appl. No.: 119,955

[22] Filed: Feb. 8, 1980

[30] Foreign Application Priority Data

Feb. 17, 1979 [DE] Fed. Rep. of Germany ....... 2906159

[51] Int. Cl.³ .............................................. C08L 75/06
[52] U.S. Cl. .................................... 525/453; 523/336; 524/591; 524/310; 524/839; 528/61
[58] Field of Search .................. 260/29.2 TN, 18 TN; 528/68, 85, 61

[56] References Cited

U.S. PATENT DOCUMENTS

| | | | |
|---|---|---|---|
| 2,968,575 | 1/1961 | Mallonee | 106/287 |
| 3,252,848 | 5/1966 | Bursellino | 156/307 |
| 3,401,133 | 9/1968 | Grace et al. | 260/29.2 |
| 3,655,627 | 4/1972 | Hutzler et al. | 260/29.2 TN |
| 3,684,639 | 8/1972 | Keberle et al. | 161/87 |
| 4,160,686 | 7/1979 | Niederdellmann et al. | 156/331 |

*Primary Examiner*—Theodore E. Pertilla
*Attorney, Agent, or Firm*—Kenyon & Kenyon

[57] ABSTRACT

The invention disclosed herein relates to a method for the preparation of finely dispersed polyurethane ureas. The method comprises the steps of first preparing a chain extended polyurethane from at least one diisocyanate, at least one polydiol, and diol chain extenders. The chain-extender component of the reaction is comprised of low molecular weight diols having side chains or ether groups, unbranched low molecular weight diols and/or monofunctional compounds having an active hydrogen such as the amines, amides or alcohols. The chain extended polyurethane is then treated with a nonionic emulsifier and emulsified first with warm water, and then with cold water. A diamine or a mixture of diamines is then added to the emulsion.

13 Claims, No Drawings

METHOD FOR THE PREPARATION OF FINELY DISPERSED POLYURETHANE UREAS

FIELD OF THE INVENTION

This invention relates to a method for preparing finely dispersed polyurethane ureas.

BACKGROUND OF THE INVENTION

DE-OS No. 23 11 635 discloses a method for the continuous manufacture of dispersed polyurethane urea materials, in accordance with which a prepolymer carrying isocyanate end groups, a chain-extending agent, and a liquid aqueous phase are introduced continuously and individually into a zone of high turbulence. The isocyanate polyaddition into polyurethane urea is effected in the zone of high turbulence. A polyurethane urea dispersion in the form of fine particles is produced. The method is complicated and leads to high-melting products which are, therefore, unsuitable for many purposes. In addition, the polyurethane urea materials produced have a very high urea group content.

Polyurethane urea materials with melting points below about 200° C. and, in particular, in the range of from about 100° to 150° C. cannot be prepared by the above-mentioned method. However, polyurethane ureas having melting points below about 200° C. are well suited for many purposes. For example, they are useful as adhesives for insert materials which can be ironed-in. When the polyurethane urea material is to be employed as an adhesive, it is desirable to prepare the polyurethane urea in a finely dispersed or powdered form. The powders can then be used with one of the conventional application methods, i.e., by sprinkling-on or by printing-on the adhesive via a dispersion.

At first glance it may appear feasible to mechanically comminute or mill known polyurethane ureas having the above-indicated melting range in order to manufacture polyurethane urea adhesive powders. Such a milling process is described by DE-OS No. 19 30 340. However, the milling process disclosed by this reference has practical disadvantages. During milling the granulate becomes quite hot and requires cooling, for example, with liquid nitrogen. Moreover, the product particles produced by this process have a greatly differing morphology, with regard to size and shape.

It has further been suggested to produce polyurethane powders by reacting the starting materials in an organic solvent or mixture of solvents, which will not function as a solvent for the reacted polyurethanes or polyurethane ureas. (See DE-OS No. 26 46 198, U.S. Pat. No. 4,032,516, DE-OS No. 25 56 945) A disadvantage of this process, however, is that a large amount of solvent is employed which must be recovered at considerable cost. Moreover, the use of solvents requires arrangements for the safety of work rooms, and for the observation of regulations for preventing the pollution of the environment.

BRIEF DESCRIPTION OF THE INVENTION

It is an object of this invention to provide a method of preparing a polyurethane urea in a finely dispersed form. The polyurethane ureas prepared in accordance with the method of this invention are recovered in a finely dispersed form suitable for direct application, and do not, therefore, require milling or other processing steps prior to application.

In accordance with the method of this invention, extended prepolymers are prepared from polydiols with an average molecular weight of between 500 and 5000, diisocyanates, and low-molecular weight diols having an average molecular weight of between about 60 and about 500, wherein as chain extenders, the following materials may be employed:

(a) low molecular weight diols with side chains or ether groups, (b) unbranched low molecular weight diols, and/or (c) monofunctional compounds containing active hydrogen, such as alcohols, amines and/or amides.

The chain extenders listed above in (c) are added in amounts up to about 5 mole percent, based on the isocyanate content of the starting mixture. The chain extenders listed above in (a) and (b) are employed in a sufficient amount such that the product prepolymers include from about 10 to about 40 mole percent free isocyanate, based on the isocyanate content of the starting mixture. After adding a suitable emulsifier, the prepolymer mixture is emulsified in two stages: first with hot water at a temperature of about 80° to 99° C. and, subsequently, with cold water at a temperature of from about 15° to 25° C. The chain-extended prepolymer, having isocyanate groups, is reacted with water, and a diamine or a diamine mixture to provide the polyurethane urea product.

DETAILED DESCRIPTION OF THE INVENTION

Suitable polyols for use in accordance with the method of this invention have a molecular weight of from about 1000 to 2000 and, preferably, have two hydroxyl groups per molecule. Thus, preferable polyols include the polyester, polyether, polythio ether, polyacetal, polycarbonate and polyesteramide-polyols.

The use of mixtures of two or more different reactants of the same class, i.e., mixtures of different polyols and/or mixtures of different diisocyanates, has the effect of lowering the melting point of the product. This is particularly true for the diamine mixtures which are employed by the method of this invention. Thus, if a diamine mixture is employed consisting of 1,6-hexamethylene diamine and 2,2,4-trimethyl-1,6-hexamethylene diamine in a ratio of about 1:1, the product may have a melting point about 15° to 20° lower than the melting point of the corresponding polyurethane urea prepared employing only hexamethylene diamine. The lowering of the melting point is also aided by the trimethyl side groups of the diamine. A similar melting point lowering effect results from the use of branched low molecular weight diols as chain extenders.

Chain extender agents for isocyanate prepolymers are compounds which carry, per molecule, at least two active hydrogen atoms and have a molecular weight of from about 62 to about 500, and preferably, from about 62 to about 250. These compounds react with the isocyanate groups of the prepolymer and build up high molecular weight polyurethane ureas by linking several isocyanate prepolymer molecules. This chain-extending reaction per se is known and, as a rule, leads to very high molecular weight products having melting points above about 200° C. As mentioned above, such polyurethane materials may be unsuitable for many uses. In accordance with this invention the melting point of the polyurethane urea product is below 200° C., and, preferably, between about 100° and about 150° C. The chain extension is, therefore, carried out only to the extent that from about 10 to about 40%, and preferably from about 15 to about 30% of free isocyanate, based on the isocyanate content of the starting mixture, is unreacted.

In addition to the bifunctional chain extenders mentioned above, monofunctional chain extenders such as monofunctional amides, amines, alcohols or the like may be employed. Suitable compounds of this type are ε-caprolactam, dibutyl amine and neopentyl alcohol.

In accordance with the present invention, the melting point of the polyurethane urea product is controlled by the extend of chain extension. In this regard it should be noted that when the content of monofunctional chain extenders exceeds about 5 mole percent, based on the isocyanate content of the starting mixture, the melting point and, in particular, the strength of the product drops in an undesirable manner, such that the product polyurethane ureas are no longer suitable for use as adhesives for insert materials. However, up to about 5 mole percent, and preferably up to about 3 mole percent of the isocyanate content of the prepolymer may be converted to urethane groups by reaction with monofunctional compounds containing active hydrogen atoms, without appreciably affecting the strength of the polyurethane-urea product. This reaction may lower the melting point of the product by about 15° to about 30° C.

It is surprising that without the use of organic solvents, low melting polyurethane ureas with a low urea content can be produced, having properties comparable to polyurethanes which are obtained by conventional processes such as casting, pressing, injection molding or the like. It is, in particular, surprising that they exhibit excellent strength and elasticity properties at the desired low melting point. The polyurethane ureas produced in accordance with the method of this invention are useful as, for example, powders for whirl sintering, adhesives, and as binders for artificial leather. The shape and size of the powder particles can be varied in a reproducible manner, as desired for the intended end-use.

The melting points or melting ranges of the polyurethane ureas prepared in accordance with the method of this invention are between about 90° and about 200° C., and preferably between about 100° and about 150° C.

Particularly soft polyurethane ureas are obtained from a reaction mixture, the diisocyanate content of which is less than about 60 parts by weight, based on about 100 parts by weight of the polydiol. Preferably the reaction mixture contains from about 25 to about 50 parts by weight diisocyanate, based on about 100 parts by weight of a polyester having an average molecular weight of about 2000.

The prepolymer is produced in a known manner by reaction of high molecular weight diols, and diisocyanates at temperatures of about 70° to about 130° C., the reaction time being matched to the predetermined temperature, for example, 2 hours at about 120° C. Reaction time is intended to refer to the duration of the reaction of all reaction partners, i.e., the high molecular weight polydiols, diisocyanates, as well as the low molecular weight diols discussed below. The low molecular weight diols may be added to the high molecular weight polydiol before the diisocyanate is added, or alternatively after the diisocyanate is added, for example, about 60 minutes after the diisocyanate is added. In general, the reaction conditions should be chosen so that the temperature in the reaction mixture does not rise above about 135° C.; in this regard the highly exothermic nature of the urethane formation should be taken into consideration.

High molecular weight diols include polydiols having a molecular weight of from about 500 to about 5000, and preferably from about 1000 to about 2000. Such polydiols include polyesters with OH-groups in the end positions, for example, polyesters formed from dicarboxylic acids such as adipic acid, sebacic acid, azelaic acid, and glycols such as ethylene glycol, 1,3-propylene glycol, 1,4-butane diol, neopentyl glycol, 1,6-hexane diol or glycol mixtures. For the preparation of the polyesters, as an alternative to free carboxylic acids, the corresponding polycarboxylic acid anhydrides or polycarboxylic acid esters of lower alcohols and mixtures thereof may be employed. The polycarboxylic acids may be of the aliphatic, cycloaliphatic, aromatic and/or heterocyclic type and may optionally be substituted or unsubstituted. Polydiols such as polycaprolactone may also be employed. Polyethers, such as those of the 1,2-propylene oxide type or the tetrahydrofuran type may also be employed as the polyol component.

Diisocyanates, which may be employed in accordance with this invention, may include, for example: 4,4'-diphenylmethane-diisocyanate (MDI), 2,4- and 2,6-toluene-diisocyanate (TDI), ditolyl-diisocyanate (TODI), 1,6-hexamethylene-diisocyanate (HDI), isophoron-diisocyanate (IPDI), 2,2,4-trimethyl-1,6-hexamethylene-diisocyanate (TMDI). The prepolymer which includes free isocyanate groups in the end positions and consisting of (n) moles of diisocyanate and (n-1) moles of polydiol, may also include excess low molecular weight diisocyanate. The mole ratio of diisocyanate to polydiol may be from about 30:1 to about 3:1. The mixture of low molecular weight diols may be added to the prepolymer. Alternatively, in accordance with a single step embodiment of the process, the low molecular weight diol mixture may be admixed with the polydiol prior to the diisocyanate reaction step.

The phrase "low molecular weight" as employed herein is intended to refer to molecular weights of from about 62 to about 500, and preferably from about 62 to about 250. The low molecular weight diols having side chains or ether groups contribute to the lowering of the melting point or the melting range of the completely reacted polyurethane urea, as well as the chain-extended prepolymer. Included within this group of low molecular weight diols are: neopentyl glycol, 2,2-dimethylhexane-1,3-diol, diethylene glycol, triethylene glycol and pentane diol. The completely reacted polyurethane urea has a melting point or melting range within the range of from about 100° to about 200° C. The chain-extended prepolymer wherein from about 60% to about 90% of the isocyanate groups have been converted to urethane groups has a melting point below about 100° C. and preferably about 80° C.

The second group of diols employed in the low molecular weight diol mixture contributes substantially to improving the strength of the product. However, if the first melting point lowering group of diols were not also included in the diol mixture, the melting point or melting range of the chain-extended prepolymer and polyurethane urea produced through the use of only this second group of diols would be unacceptably high. The second group of diols includes unbranched low molecular weight diols such as ethylene glycol, 1,4-butane diol and 1,6-hexane diol. The diols of the second group may be added alone or as a mixture of two or more unbranched diols.

In the low molecular weight diol mixture, the mole ratio of the melting point lowering diols to the strength enhancing diols may be from about 25:75 up to about 60:40, and preferably of about 30:70 up to about 45:55. Among the monofunctional compounds carrying an active hydrogen, which may be added in small amounts to the chain-extended prepolymer, are, for example, neopentyl alcohol, dibutylamine and/or ε-caprolactam.

The low molecular weight diol mixture described above preferably consists of at least one diol for lowering the melting point, and advantageously of two or more diols which enhance the strength of the product. The low molecular weight diols are employed in amounts and amount ratios such that the polyurethane having isocyanate end groups, and which is chain-extended by the addition of the diols, remains liquid at temperatures below about 100° C. and preferably below about 90° C., while at least from about 60 to about 90 mole percent, and preferably about 70 to about 85 mole percent of the originally (i.e., prior to the start of the polyurethane reaction) present isocyanate groups are reacted to urethane groups by the addition of the diols.

The prepolymers prepared from the diisocyanate and the above-described high molecular weight diols form a diurethane diisocyanate, which, as mentioned above, may include excess diisocyanate. A mixture of branched and/or ether group containing low molecular weight diols such as neopentyl glycol, 2,2-diethylpropane-1,3-diol and/or diethylene glycol may be added to this prepolymer as the chain extender. A polyurethane urea product having excellent strength properties such as tensile strength, ultimate percent elongation, and tear propagation resistance properties is obtained when straight chain low molecular weight diols and diamines or diamine mixtures are also employed in the chain extender mixture. As will be described below the diamines or diamine mixtures are added after the extended prepolymer is dispersed in water.

A water-free, nonionic emulsifier containing no active hydrogen atoms is added to the chain-extended prepolymer. Suitable emulsifiers are commercially available, for example, under the designation ethoxylated ricinol oil or ethoxylated fatty alcohols. The amount of emulsifier employed affects the particle size of the polyurethane urea powder. The particle sizes which can vary over a wide range are reduced with increasing emulsifier content.

For a polyurethane urea powder with a particle size under 100 μm, emulsifier is added to the prepolymer in quantities of from about 5 to about 15 parts, per 100 parts of chain-extended prepolymer. The prepolymer-emulsifier mixture may be at a temperature of about 100° C., and exhibits at this temperature viscosities of from about 5000 to about 20,000 centipoise. To this prepolymer-emulsifier mixture, water at a temperature of about 90° C. is added with vigorous stirring. The hot water added during this step is generally not cooler than about 70° C., and is preferably at a temperature of from about 90° to about 95° C. The mixing is done quickly and should take about 5 minutes and at the most about 10 minutes. The ratio of the amount of water to prepolymer-emulsifier mixture is about 1:1, and is apportioned so that the transition of the "water-in-oil" emulsion into low-viscosity "oil-in-water" emulsion is almost complete. Then, water at a temperature of from about 15° to about 25° C. is stirred into the oil-in-water emulsion. Preferably, the amount of cold water added, i.e., water at about 15° to about 25° C. is added in amounts about four to five times as great as the amount of warm water employed, i.e., water at a temperature of about 90° to about 95° C. added during the first water addition step. The diamine or the diamine mixture is then added. The quantity of diamine added may be stoichiometric, based on the free isocyanate groups present, or, alternatively, a stoichiometric deficiency of the diamine may be employed. Besides influencing the property pattern, the addition of diamine enhances the rate of completion of the polyurethane reaction and thus, the further processing of the polyurethane urea powders. Corresponding to the low molecular weight diols, the diamines may be unbranched or branched diamines having side chains. The use of branched diamines has a distinct melting point lowering effect.

As mentioned above, it is possible to emulsify the prepolymer through the use of a suitable nonionic emulsifier and water of greater than about 70° C., and preferably at about 90° to about 95° C. The free isocyanate groups remaining after the diol addition may comprise about 40 mole percent, and preferably from about 15 to about 30 mole percent of the isocyanate content of the starting reaction mixture. The free isocyanate groups are converted into urea groups by the water treatment and/or the diamine treatment step. This reaction does not cause an appreciable increase in the melting point as compared to the melting point of the corresponding pure, i.e., urea-group free polyurethane. If the chain-extended polyurethane which has been emulsified with hot water is diluted quickly, i.e., within about five to about ten minutes with cold water, wherein about four to five times the amount of cold water as warm water is employed, then only a small portion, i.e., about 1 to about 4 mole percent of the originally, (i.e., prior to the addition of the hot water) present isocyanate groups are converted to urea groups by the treatment with water. Thus, it is possible to vary the chemical structure, and thereby also the properties of the polyurethane urea product by adding to the aqueous dispersion diamines or diamine mixtures which are known to react substantially faster than water.

After several hours, preferably more than about 10 hours, the polyurethane powder is recovered from the water by filtration or centrifugation. The recovered polyurethane urea powder contains from about 30 to about 50 percent water. Completely dry powder may be obtained, for example, by drying the powder in a circulating air cabinet at about 60° C. for about 24 hours. Additives such as fillers, pigments, anti-aging agents, etc. can be added before, during, or after the dispersion.

In accordance with the prepolymer preparation of this invention, a polyol mixture can be used instead of a single polyol, and a diisocyanate mixture instead of a single diisocyanate. In accordance with the method the present invention, soft, low melting polyurethane ureas are obtained.

Thus, the method of manufacturing the polyurethane urea powders of this invention may be summarized as follows:

1. Preparation of the prepolymer
2. Chain extension of the prepolymer
3. Stirring a suitable emulsifier into the prepolymer
4. Emulsifying the prepolymer in hot water to form a "water-in-oil" emulsion
5. Dilution with cold water, or, alternatively, dilution first with hot water, and then with cold water, to form an "oil-in-water" emulsion.
6. Addition of diamines for end cross-linking 7. Filtration and centrifugation; washing and drying of the powder.

The process can be carried out continuously or batchwise.

The following examples serve to illustrate the invention, but are not intended as a limitation thereon.

EXAMPLE 1

100.0 g of a polybutylene glycol-ethylene glycol adipic acid polyester with an OH-number of 56 (molecular weight 2000)

7.28 g neopentyl glycol
6.3 g 1,4-butane diol
7.08 g 1,6-hexane diol
50.0 g 1,6-hexamethylene-diisocyanate
1.8 g $\epsilon$-caprolactam are heated together to about 60° C. while being stirred. The temperature then increases to about 120° C. without the addition of external heat. The temperature is kept constant for 2 hours, and the mixture is stirred for 2 hours. $\epsilon$-caprolactam is added 15 minutes before the end of the reaction. Then, 17.0 g of an ethoxylated castor oil (trade name: Emulan ® EL) are mixed in. The mixture is cooled down to 100° C. (viscosity: 15,000 centipoises). Then 170 cm³ water at a temperature of 90° C. is mixed with the prepolymer-emulsifier mixture over a 3 minute period. During the water addition step the mixure is virgorously stirred with a high speed laboratory stirrer equipped with a dispersion disc. Immediately upon completion of the water addition step, another 660 cm³ of water at 20° C. is added to the mixture. The temperature of the dispersion drops to about 35° C. Then, a mixture consisting of 2.3 g 1,6-hexamethylene diamine and
3.0 g 2,2,4-trimethyl-1,6-hexamethylene diamine is stirred in. After about 4 hours, a powder formed and settled. After about 24 hours, the water was separated from the powder by means of a laboratory centrifuge. The moist matter was slurried in about 500 cm³ of water and centrifuged again. Finally, the powder was dried for 24 hours at 60° C.

| Properties of the Dried Powder | |
|---|---|
| Melting Range: (measured on the Kofler heating bank) | 110 to 120° C. |
| Melting index: (2.16 kg at 150° C.) | 5 g/10 min. |

From the powder, foils 0.3 mm thick were pressed at 140° C., which had the following strength properties:

| | |
|---|---|
| Tensile strength (N/mm²): (DIN 53371) | 29.7 |
| Ultimate elongation (%): (DIN 53371) | 1340 |
| Tear propagation resistance (N/mm): (DIN 53356) | 63.8 |

The diameter of the spherical powder particles is between 10 and 80 μm, the major portion is around 60 μm.

EXAMPLE 2

100.0 g of a polybutylene glycol-ethylene glycol adipic acid polyester with an OH-number of 56 and a molecular weight of 2000.

5.2 g neopentyl glycol
4.5 g 1,4-butane diol
4.72 g 1,6-hexane diol
40.0 g 1,6-hexamethylene-diisocyanate
1.8 g $\epsilon$-caprolactam
15.0 g ethoxylated castor oil (Emulan ® EL)
2.3 g 1,6-hexamethylene diamine
3.1 g 2,2,4-trimethyl-1,6-hexamethylene diamine
170.0 cm³ water of 90° C.
660.0 cm³ water of 20° C.

A polyurethane urea powder was prepared from the above-listed components in accordance with the procedure of Example 1.

| Properties of the Dried Powder | |
|---|---|
| Melting Range: (Kofler heating bank) | 110 to 120° C. |
| Melting index: (2.15 kg at 150° C.) | 10 g/10 min |

| Strength Properties of a Pressed Foil 0.3 mm Thick: | |
|---|---|
| Tensile strength (N/mm²): (as per DIN 53371) | 25.2 |
| Ultimate elongation (%): (as per DIN 53371) | 1670 |
| Tear propagation resistance (N/mm): (as per DIN 53356) | 56.3 |
| Diameter of the powder particles: | 10 to 80 μm |

EXAMPLE 3

100.0 g of a polybutylene glycol-ethylene glycol adipic acid polyester with an OH-number of 56 (molecular weight 2000)

5.2 g neopentyl glycol
4.5 g 1,4-butane diol
4.72 g 1,6-hexane diol
40.0 g 1,6-hexamethylene-diisocyanate
15.0 g ethoxylated castor oil (Emulan ® EL)
2.3 g 1,6-hexamethylene diamine
3.1 g 2,2,4-trimethyl-1,6-hexamethylene diamine
170.0 cm³ water of 90° C.
660.0 cm³ water of 20° C.

A polyurethane urea powder was prepared from the above-listed components in accordance with the procedure of Example 1.

| Properties of the Dried Powder | |
|---|---|
| Melting range: (Kofler heating bank) | 135 to 145° C. |
| Melting index: (2.16 kg at 150° C.) | <1 g/10 min |

| Strength Properties of a Pressed Foil 0.3 mm Thick | |
|---|---|
| Tensile strength (N/mm²): (as per DIN 53371) | 29.8 |
| Ultimate elongation (%): (as per DIN 53371) | 1760 |
| Tear propagation resistance (N/mm): (as per DIN 53356) | 51.7 |
| Diameter of the powder particles: | 10 to 80 μm |

Unlike the polyurethane urea of Example 2, $\epsilon$-caprolactam was not employed in the preparation of the polyurethane urea of this Example. The melting range of the product of this Example is 25% higher. However, the melting index of the product of Example 3 is distinctly lower than the melting index of the product of Example 2.

EXAMPLE 4

100.0 g of a polybutylene glycol-ethylene glycol adipic acid polyester with an OH-number of 56 (molecular weight 2000)
5.2 g neopentyl glycol
4.5 g 1,4-butane diol
4.72 g 1,6-hexane diol
40.0 g 1,6-hexamethylene-diisocyanate
1.8 g ε-caprolactam
15.0 g ethoxylated castor oil (Emulan ® EL)
4.6 g 1,6-hexamethylene diamine
170.0 cm³ water of 90° C.
660.0 cm³ water of 20° C.

A polyurethane urea was prepared from the above-listed components in accordance with the procedure of Example 1.

| Properties of the Dried Powder | |
|---|---|
| Melting range: (Kofler heating bank) | 130 to 140° C. |
| Melting index: (2.16 kg at 150° C.) | 4.5 g/10 min |

Unlike the polyurethane urea of Example 2, this polyurethane urea contains no 2,2,4-trimethyl-1,6-hexamethylene diamine; the 1,6-hexamethylene diamine content was increased accordingly in an equivalent manner.

As compared to the polyurethane urea of Example 2, the melting range and the melting viscosity of the product of this Example are distinctly higher.

EXAMPLE 5

100.0 g of a polybutylene glycol-ethylene glycol adipic acid polyester with an OH-number of 56 (molecular weight 2000)
3.12 g neopentyl glycol
2.7 g 1,4-butane diol
2.36 g 1,6-hexane diol
30.0 g 1,6-hexamethylene-diisocyanate
1.8 g ε-caprolactam
14.0 g ethoxylated castor oil (Emulan ® EL)
2.3 g 1,6-hexamethylene diamine
3.1 g 2,2,4-trimethyl-1,6-hexamethylene diamine
140.0 cm³ water of 90° C.
560.0 cm³ water of 20° C.

A polyurethane urea was prepared from the above-listed components in accordance with the procedure of Example 1

| Properties of the Dried Powder | |
|---|---|
| Melting range: (Kofler heating bank) | 110 to 120° C. |
| Melting index: (2.16 kg at 150° C.) | 14.0 g/10 min |

| Strength Properties of a Pressed Foil 0.3 mm Thick | |
|---|---|
| Tensile strength (N/mm²): (as per DIN 53371) | 15.6 |
| Ultimate elongation (%): | 1750 |
| Tear propagation resistance (N/mm): (as per DIN 53356) | 41.8 |
| Diameter of the powder particles: | 10 to 70 μm |

EXAMPLE 6 (REFERENCE TEST)

100.0 g of a polybutylene glycol-ethylene glycol adipic acid polyester with an OH-number of 56 (molecular weight 2000)
7.28 g neopentyl glycol
1.8 g 1,4-butane diol
30.0 g 1,6-hexamethylene-diisocyanate
2.7 g ε-caprolactam
14.0 g (Emulan ® EL) ethoxylated castor oil
3.0 g 1,6-hexamethylene diamine
140.0 cm³ water of 90° C.
560.0 cm³ water of 20° C.

A polyurethane urea was prepared from the above-listed components in accordance with the procedure of Example 1.

| Properties of the Dried Powder: | |
|---|---|
| Melting range: (Kofler heating bank) | 115 to 125° C. |
| Melting index: (2.16 kg at 150° C.) | 12.0 g/10 min |

| Strength Properties of a Pressed Foil at 0.3 mm Thick | |
|---|---|
| Tensile strength (N/mm²): (as per DIN 53371) | 8.1 |
| Ultimate elongation (%): (as per DIN 53371) | 1150 |
| Tear propagation resistance (N/mm): (as per DIN 53356) | 34.5 |
| Diameter of the powder particles: | 10 to 80 μm |

The neopentyl glycol content is substantially higher than the 1,4-butane diol content; more than 5% of the isocyanate content was converted into urethane by ε-caprolactam. The tensile strength is considerably lower than in the preceding examples.

This invention has been described in terms of specific embodiments set forth in detail herein. It should be understood, however, that these are by way of illustration only and that the invention is not necessarily limited thereto. Modifications and variations will be apparent from this disclosure and may be resorted to without departing from the spirit of this invention, as those skilled in the art will readily understand. Accordingly, such variations and modifications of the disclosed embodiments are considered to be within the scope of this invention and the following claims.

We claim:

1. A method for the preparation of finely dispersed polyurethane ureas having a melting range of from about 90° to about 200° C. and a particle size below about 100 μm, comprising the steps of:
   (a) preparing a polyurethane by reacting a diisocyanate, a polyester and a mixture of at least three diols, wherein at least one of said diols has alkyl side chains or includes an ether group, and wherein at least one of said diols is unbranched, said diols in said mixture having a molecular weight of from about 62 to about 500, and said polyurethane having a free isocyanate group content which comprises from about 10 to about 40 mole percent of the isocyanate content of the starting mixture, followed by (b) adding an emulsifier to said polyurethane, and adding water at a temperature above about 70° C. to said polyurethane and emulsifier, wherein the amount of water added to said polyurethane is adapted to provide a water-in-oil emulsion of said polyurethane in water, followed by (c) adding water at a temperature of about 15° C. to about 25° C. to said emulsion to provide an oil-in-water emulsion, and treating said oil-in-water emulsion with a chain extending diamine or diamine mixture.

2. The method according to claim 1 wherein said chain-extended polyurethane is prepared from a polyester, a diisocyanate and chain extenders wherein said chain extenders comprise a mixture of (a) low molecular weight diols having side chains or ether groups,
(b) unbranched low molecular weight diols, and
(c) monofunctional compounds having an active hydrogen selected from the group consisting of alcohols, amines or amides, wherein said monofunctional compounds are employed in amounts of up to about 5 mole percent of the isocyanate content of the starting mixture.

3. The method according to claim 1 or 2 wherein said diisocyanates and said low molecular weight diols have a molecular weight of from about 60 to about 500, and said polyester have an average molecular weight of from about 500 to about 5000.

4. The method according to claim 3 wherein the mole ratio of said low molecular weight diols having side chains or ether groups, to said unbranched low molecular weight diols is from about 25:75 to about 60:40.

5. The method according to claim 4 wherein said extended polyurethane has a free-isocyanate content of from about 15 to about 30 mole percent of the isocyanate content of the starting mixture.

6. The method according to claim 4 wherein said monofunctional compound is selected from the group consisting of ε-caprolactam, dibutyl amine and neopentyl alcohol.

7. The method according to claim 4 wherein said polyester have a molecular weight of from about 1000 to about 2000.

8. The method according to claim 3 wherein said polyester is a polyester of a dicarboxylic acid and a diol or a mixture of diols, wherein said dicarboxylic acid is selected from the group consisting of adipic acid, sebacic acid and azelaic acid; and wherein said diol is selected from the group consisting of 1,3-propylene glycol, 1,4-butane diol, and 1,6-hexane diol; said polyester having hydroxyl end groups.

9. The method according to claim 3 wherein said polyester is a polybutylene glycol-ethylene glycol adipic acid polyester having an OH-number of 56, and a molecular weight of about 2000.

10. The method according to claim 4 wherein said diisocyanate is selected from the group consisting of 4,4'-diphenylmethane-diisocyanate, 2,4- and 2,6-toluene-diisocyanate, ditolyl-diisocyanate, 1,6-hexamethylene-diisocyanate, isophoron-diisocyanate and 2,2,4-trimethyl-1,6-hexamethylene-diisocyanate.

11. The method according to claim 3 wherein said diamine mixture comprises a mixture of branched and unbranched diamines.

12. The method according to claim 11 wherein said diamine mixture comprises a mixture of 2,2,4-trimethyl-1,6-hexamethylene-diamine and 1,6-hexamethylene diamine.

13. The method according to claim 4 wherein said emulsifier is a nonionic ethoxylated castor oil or ethoxylated fatty alcohol and wherein from about 5 to about 15 parts of said emulsifier are added per 100 parts of said extended polyurethane.

* * * * *

UNITED STATES PATENT AND TRADEMARK OFFICE
CERTIFICATE OF CORRECTION

PATENT NO. : 4,321,173
DATED : March 23, 1982
INVENTOR(S) : Günter Schuhmacher, Bertram Freudenberg, Horst Mühlfeld It is certified that error appears in the above—identified patent and that said Letters Patent is hereby corrected as shown below:

Column 3, line 11, delete "extend" and insert --extent--.

Column 6, line 54, after the word "method" insert --of--.

Column 11, line 34, delete "have" and insert --has--.

Column 12, line 8, delete "have" and insert --has--.

Signed and Sealed this

Thirty-first Day of August 1982

[SEAL]

Attest:

GERALD J. MOSSINGHOFF

Attesting Officer

Commissioner of Patents and Trademarks